United States Patent [19]
Dellacoletta

[11] Patent Number: 4,910,288
[45] Date of Patent: Mar. 20, 1990

[54] PROCESS FOR THE PREPARATION OF POLYETHERIMIDES

[75] Inventor: Brent A. Dellacoletta, Evansville, Ind.

[73] Assignee: General Electric Company, Pittsfield, Mass.

[21] Appl. No.: 306,929

[22] Filed: Feb. 7, 1989

[51] Int. Cl.[4] .............................................. C08G 69/26
[52] U.S. Cl. .................................... 528/353; 528/125; 528/126; 528/128; 528/172; 528/185
[58] Field of Search ............... 528/353, 125, 126, 128, 528/172, 185

[56] References Cited
U.S. PATENT DOCUMENTS
3,234,181  2/1966  Olivier ................................ 528/353

Primary Examiner—John Kight
Assistant Examiner—M. L. Moore
Attorney, Agent, or Firm—Bernard, Rothwell & Brown

[57] ABSTRACT

An improved solution polymerization process for the preparation of polyetherimides comprises prereacting an aromatic bis(ether anhydride) with an aromatic diamine, followed by the addition of phthalic anhydride end capping agent and further reaction to form an end capped prepolymer. The prepolymer is converted to polyetherimide. The improved process advantageously greatly reduces the formation of PAMI, an undesired byproduct.

10 Claims, No Drawings

PROCESS FOR THE PREPARATION OF POLYETHERIMIDES

BACKGROUND OF THE INVENTION

The present invention relates to processes for the preparation of polyetherimides and, more particularly, to processes which reduce the formation of the undesirable byproduct phthalic anhydride m-phenylenediamine imide (hereinafter "PAMI") during the preparation of polyetherimides.

Because of their light weight, durability and strength, engineering thermoplastics are widely used. One class of engineering themoplastics are the polyetherimides to which the present invention is directed.

Polyetherimides are sold by the General Electric Company under the trademark Ultem ®. Such products of the General Electric Company include Ultem ®1000 and ULTEM ®1010 which are polyetherimide resins derived from bisphenol A dianhydride and m-phenylenediamine with phthalic anhydride used as an end-capping and chain-stopping agent. Polyetherimide resins are well known in the art and are of considerable commercial value for use in molding compositions because of their excellent physical, chemical and thermal properties. The high glass transition and heat deflection temperatures exhibited by these polymers permit their use in high performance applications. The Ultem ®1000 and 1010 products mentioned above, for example, find applications in the automotive, aerospace and electrical industries.

A number of processes for making polyetherimides have been disclosed. Generally, these polymers are prepared by reacting an organic diamine with an aromatic bis(ether dicarbonyl), i.e., an aromatic bis(ether-anhydride) or an aromatic bis(ether dicarboxylic acid). Two processes which have been of particular interest are the so-called melt polymerization and solution polymerization processes. The basic melt polymerization process was described by T. Takekoshi and J. Kochanowski in U.S. Pat. No. 3,803,805. This process involves combining an aromatic bis(ether anhydride) and an organic diamine and heating the mixture under an inert atmosphere to form a homogeneous melt. Water formed during the polymerization reaction is removed at a temperature of up to 350° C. In a preferred embodiment of the process, the final stage of the reaction is conducted under reduced pressure to facilitate removal of water. The basic polyetherimide polymerization technique has been improved by employing catalysts to enhance yields or reaction rates (for example, see Takekoshi, et al. U.S. Pat. No. 3,833,544 and F. Williams III, et al., U.S. Pat. No. 3,998,840, and Takekoshi, U.S. Pat. No. 4,324,882). In addition, the melt polymerization method has been adapted to the continuous mode by conducting the reaction in extrusion apparatus (for example, see Takekoshi, et al. U.S. Pat. No. 4,011,198 and Banucci, et al. U.S. Pat. No. 4,073,773).

Solution polymerization is generally conducted by reacting an aromatic bis(ether anhydride) and an organic diamine in an inert solvent at temperatures up to about 200° C. With this procedure, water of reaction is typically removed by azeotropic distillation. The resulting polymer is generally recovered by mixing the reaction solution with a precipitant, such as methanol.

The reaction solvents employed for solution polymerization reactions are selected for their solvent properties and their compatibility with the reactants and products. High-boiling nonpolar organic solvents are preferred. (E.g., see Takekoshi, et al., U.S. Pat. No. 3,991,004). Dipolar, aprotic solvents and phenolic solvents can also be used, particularly when an aromatic bis(ether dicarboxylic acid) is used as the starting material (e.g., see Takekoshi, et al., U.S. Pat. No. 3,905,942).

D. Heath and J. Wirth (U.S. Pat. No. 3,847,867) disclose a method for preparing polyetherimides which involves stirring a solution of an aromatic bis(ether anhydride) and an organic diamine in a dipolar, aprotic solvent under ambient conditions to produce a polyamide acid and casting the polyamide acid solution on a substrate to facilitate the removal of the organic solvent. The cast polyamide acid film can then be heated at temperatures of 150° C. or higher. After the initial heating, the cast film can then be heated to temperatures of from 200° C. to 300° C. to convert the polyamide acid to the polyetherimide.

A process for making polyetherimides which is particularly preferred from the commercial standpoint is disclosed in U.S. Pat. No. 4,417,044 to Parekh. This disclosure is incorporated by reference herein Parekh discloses the reaction of an aromatic bis(ether anhydride) with an organic diamine and a "chain stopping agent" in an inert solvent mixture to form a prepolymer. The prepolymer generally contains a substantial amount of polyetherimide, but also typically contains partially reacted oligomers and polyamide acid intermediate compounds. The prepolymer is subsequently subjected to a second process step wherein the mixture is formed into a thin film under solvent-volatilizing conditions to effect substantially complete solvent and water removal. Further heating of the reaction product, preferably in a second thin film evaporator, substantially completes the polymerization to the desired polyetherimide. Polyetherimide removed from the second thin film evaporator can be continuously extruded, air cooled and pelletized to form a resin product suitable for injection molding and other applications such as sheet production.

The Parekh solution polymerization process has proven to be a highly efficient process for the production of polyetherimides. Unfortunately, the production of sheet materials via thin film extrusion of polyetherimide resins produced via the Parekh process described above has been accompanied by the frequent formation (termed "plateout" in the industry) of an intractable coating upon the nip rollers of the sheet-forming equipment. The coating appears as a powder and can interfere with the quality of the sheet materials, for example by causing visible imperfections in the sheets.

Accordingly it is an object of the present invention to provide an improved solution polymerization process for the production of polyethrimides which results in lower formation of plateout materials. It is another object of the invention to modify the Parekh solution polymerization process to reduce the formation of plateout materials while retaining the many advantages of that process.

SUMMARY OF THE INVENTION

The plateout material which builds up on the nip rollers during production of polyetherimide sheet materials was analyzed and found to consist of a low molecular weight byproduct formed from the reaction of two moles of phthalic anhydride chain stopper and one mole of m-phenylenediamine. The byproduct is of formula

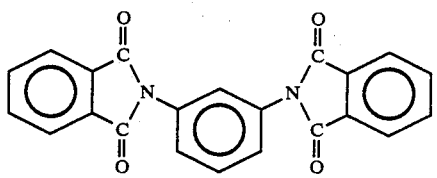

and referred to herein as phthalic anhydride m-phenylenediamine imide or "PAMI." The PAMI plate-out material appears as a white powder which sublimes at temperatures above about 300° C. The analysis of polyetherimide resins produced according to the Parekh process described above revealed that PAMI content within the resins can vary from batch to batch within a typical range of from about 400 to over 800 parts per million.

It has now been discovered that the formation of PAMI can be greatly minimized via the present invention in which a process of forming a polyetherimide comprises:

(a) partially reacting an aromatic bis(ether anhydride) with an organic diamine under polyetherimide-forming conditions to form a prepolymer;

(b) reacting the prepolymer with a phthalic anhydride end capping agent under conditions to form an end-capped prepolymer; and (c) heating the end-capped prepolymer under conditions to convert substantially all of said prepolymer to polyetherimide.

DETAILED DESCRIPTION OF THE INVENTION

The first step of the process of the present invention involves reacting an aromatic bis(ether anhydride) of the formula

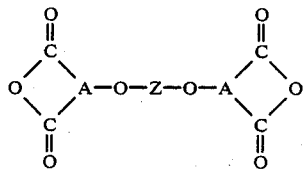 (I)

with at least one organic diamine having the formula $H_2N-R-NH_2$ (II)

in an inert solvent under polyetherimide-forming conditions, wherein the group

is selected from:

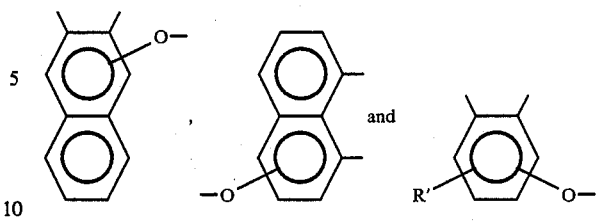

R' being hydrogen, lower alkyl or lower alkoxy, Z is a member selected from the group consisting of (A) divalent organic radicals of the formula:

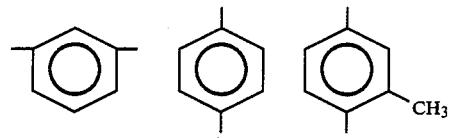

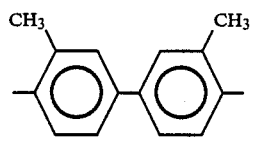

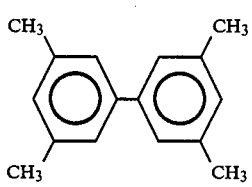

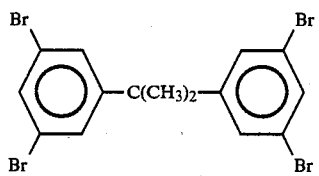

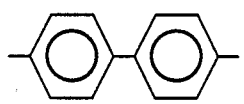

and (B) divalent organic radicals of the general formula

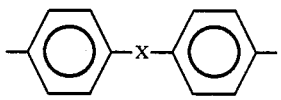

where X is a member selected from the group consisting of divalent radicals of the formulas

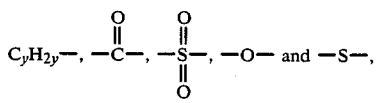

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms and cycloalkylene radicals having from 3 to about 20 carbon atoms, (c) from $C_2$ to about $C_8$ alkylene terminated polydiorganosiloxane, and (d) divalent radicals of the general formula

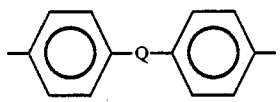

where Q is a member selected from the group consisting of:

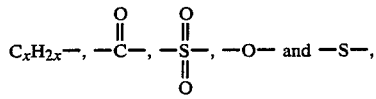

and x is an integer from 1 to about 5.

Bis(ether anhydride)s of formula I include for example, 1,3-bis(2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; and 1,4-bis(3,4-dicarboxyphenoxy)benzene dianhydride.

A preferred class of aromatic bis(ether anhydride)s included by formula I includes compounds of formulas III, IV and V, which follow:

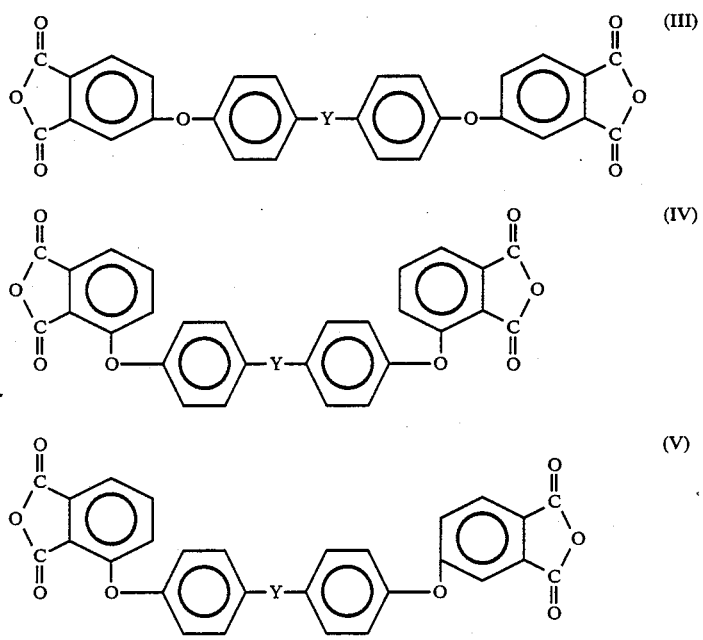

and mixtures thereof, where Y is selected from the group consisting of —O—, —S—,

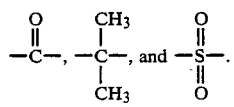

Aromatic bis(ether anhydride)s of formula III include, for example:

2,2-bis[4-(3,4-dicarboxyphenoxy)phenyl]propane dianhydride, 4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula IV include, for example:

2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride; and mixtures thereof.

The aromatic bis(ether anhydride) of formula V may be, for example,
4-(2,3-dicarboxyphenoxy)-4'-(3,4-dicarboxyphenoxy)-diphenyl-2,2-propane dianhydride.

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyldinitrile with a metal salt of a dihydric phenol compound in the presence of a dipolar, aprotic solvent.

Additional aromatic bis(ether anhydride)s also included by Formula (I) are shown by Koton, M. M.; Florinski, F. S.; Bessonov, M. I.; Rudakov, A. P. (Institute of Heteroorganic Compounds, Academy of Sciences, U.S.S.R.), U.S.S.R. No. 257,010, Nov. 11, 1969, Appl. May 3, 1967, and by M. M. Koton, F. S. Florinski, Zh. Org. Khin, 4(5), 774 (1968).

Other dianhydrides may also be used in combination with the dianhydrides of Formula I to form copolymers. Examples of such dianhydrides include pyromellitic dianhydride, sulfur dianhydride, benzophenone dianhydride and the like.

The organic diamines of Formula (II) include, for example:
m-phenylenediamine,
p-phenylenediamine,
4-4'-diaminodiphenylpropane,
4-4'-diaminodiphenylmethane (commonly named 4,4'-methylenedianiline).
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3'-dimethylbenzidine,
3,3'-dimethoxybenzidine;
2,4-bis($\beta$-amino-t-butyl)toluene,
bis(p-$\beta$-amino-t-butylphenyl)ether,
bis(p-$\beta$-methyl-o-aminopentyl)benzene,
1,3-diamino-4-isopropylbenzene,
1,2-bis(3-aminopropoxy)ethane, benzidine,
m-xylylenediamine,
p-xylylenediamine,
2,4-diaminotoluene
2,6-diaminotoluene,
bis(4-aminocyclohexyl)methane;
3-methylheptamethylenediamine,
4,4-dimethylheptamethylenediamine;
2,11-dodecanediamine,
2,2-dimethylpropylenediamine,
octamethylenediamine,
3-methoxyhexamethylenediamine;
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide
N-methyl-bis(3-aminopropyl)amine, hexamethylenediamine, heptamethylenediamine, nonamethylenediamine, decamethylenediamine,
bis(3-aminopropyl)tetramethyldisiloxane,
bis(4-aminobutyl)tetramethyldisiloxane, and mixtures of such diamines.

The polyetherimide-forming conditions employed in the first process step are similar to those disclosed in the Parekh patent and generally include a reaction temperature of from about 40° C. to about 200° C., preferably from about 80° C. to about 180° C. The solvent can be an inert nonpolar organic solvent or an inert polar solvent that does not deleteriously affect the reaction. Relatively high-boiling solvents are preferred, and examples of such solvents are chlorobenzene, dichlorobenzenes, trichlorobenzenes, diphenylether, diphenylsulfide, acetophenone, chlorinated biphenyl, chlorinated diphenylethers, methylcyclohexane, and the like. o-Dichlorobenzene is preferred.

Polar reaction solvents that can be used include phenolic solvents, such as phenols, cresols, ethylphenols, isopropylphenols, t-butylphenols, xylenols, chlorophenols, dichlorophenols, phenylphenols, and the like. In addition, dipolar, aprotic solvents can be employed as reaction solvents. Such solvents are generally non-acid, oxygen-containing, nitrogen-containing organic solvents and include, for example, N,N-dimethylacetamide, N-methylpyrrolidone, N,N-dimethylformamide, dimethylsulfoxide, hexamethylphosphoramide, and the like. Mixtures of solvents can also be employed.

The order of addition of reactants is not critical, provided that the end capping agent is added subsequent to the partial reaction of the anhydride with the diamine in accordance with the invention. It is preferred to effect the reaction of the dianhydride and the organic diamine under reflux and in an inert atmosphere, such as nitrogen or helium. Sufficient solvent is generally utilized to provide a solids content in the range between 1% and 90%, preferably in the range between about 15% and about 60%.

It has been found that substantially equal molar amounts of the organic amine end groups and the aromatic bis(ether anhydride) end groups provide optimum results. Stoichiometry should be closely controlled, the preferred range being from about 0.95 to about 1.05 mole of organic diamine end groups per mole of anhydride end groups.

Various catalysts can be employed in catalytic amounts. Such catalysts include inorganic salts, such as alkali metal carbonates, sodium chlorate or ferric sulfate, and oxygenated phosphorous compounds of various alkali metals, such as sodium phenyl phosphonate.

Reaction time for the first "partial reaction" process step can vary from about 0.5 to about 5 hours, more typically about 0.75 to 1.5 hours, depending upon such factors as the temperature employed, degree of agitation, nature of reactants, solvent, and the like. The progress of this first partial reaction step is monitored by monitoring the opacity of the reaction mixture. Upon becoming homogeneous, the reaction mixture turns from opaque to clear.

A phthalic anhydride end capping agent is added to the reaction mixture following the partial reaction of the bis(ether anhydride) with the diamine. The reaction proceeds, optionally under reflux, following the addition of the end-capping agent. Temperature and other reaction conditions remain as before the addition of the end-capping agent.

Following the addition of the end-capping agent, the reaction can be conveniently monitored by measuring the melt viscosity (melt flow) of the polymer that is produced. Generally, higher melt viscosities indicate greater degrees of polymerization.

During the course of the reaction, water of reaction is removed. The amount of water generated, as a percentage of theoretical, can also be used to monitor the course of the reaction. Water ca be conveniently removed o a continuous basis by azeotropic distillation, employing a low-boiling azeotropic solvent.

The prereaction process sep followed by the end-capping process step produces an end-capped prepolymer-in-solvent mixture. As used herein, the term prepolymer means a material which generally contains a substantial amount of polyetherimide, but also typically contains partially reacted oligomers and polyacid amide intermediate compounds.

The prepolymer-solvent mixture from the first two reaction steps is subjected to a further process step, wherein the mixture is heated to temperatures generally higher than in the previous steps in order to complete the conversion to polyetherimide and to drive off remaining solvent. This step can advantageously be conducted in a continuous manner using conventional thin-film evaporation equipment whereby the prepolymer/- solvent mixture is formed into a thin film under conditions to effect substantially complete solvent and water removal. Such equipment can take a variety of forms, and the process of the present invention is not limited to any particular form of equipment. Typical thin-film evaporation equipment consists of a heated, large-diameter, cylindrical or tapered tube in which is rotated a series of wipers, either maintaining a fixed close clearance from the wall or riding on a film or liquid on the wall. The continuous forming and reforming of the film permits concentration of viscous materials. Reduced pressure may be employed to accelerate solvent removal, and an evaporation temperature of from about 200° C. to about 450° C. preferably from about 250° C. to about 350° C. is employed. Lower temperatures result in very viscous mixtures, which are difficult to process and can damage equipment, whereas higher temperature can cause decomposition of the produce. Thin-film evaporation permits efficient solvent recovery, which is advantageous from both economical and ecological standpoints.

The elevated temperatures employed in this subsequent heating process step result in further polymerization of the prepolymer. The degree of polymerization is dependent on a number of factors, including throughput rate, temperature, pressure and surface renewal rate.

In a particularly preferred embodiment, the 'heating' process step is accomplished in two phases. The first phase encompasses the formation of a thin film as described above and at temperatures generally ranging from about 150° to about 190° C. The product of this process step is generally a prepolymer having a substantially reduced solvent content. In a second phase, the prepolymer from the first phase is heated to a temperature above the glass transition temperature of the polyetherimide polymer product and less than about 450° C. to form a polyetherimide. Preferred temperatures for this step range from about 250° C. to about 350° C. Substantially complete polymerization and solvent and water removal occur i this second phase. From a processing standpoint, there might not be a clear separation between the first and second phases of the 'heating' process step. For example, the prepolymer may be retained in a thin-film evaporator beyond the point at which a substantial portion of the solvent has been removed, thus effecting substantially complete polymerization.

In a preferred embodiment of the process, the prepolymer is continuously transferred from the outlet of a first thin-film evaporator to the inlet of a second thin-film evaporator maintained at melt polymerization temperatures. The second phase is conducted in the second thin-film evaporator and advantageously employs reduced pressure to facilitate removal of remaining traces of solvent and water. From the second thin-film evaporator the polyetherimide can be continuously extruded, air cooled, and pelletized t form a resin product suitable for injection molding and other applications. Such extrusion can be effected, for example, by means of a pump which pumps the heated polymer from the second thin-film evaporator through a suitable die.

In an alternative embodiment, the first and second phases of the 'heating' process step are conducted in a combined thin-film evaporator-screw extrusion apparatus. In this embodiment, the first phase (solvent removal) occurs in the thin-film evaporator and the second phase (final conversion) occurs in the screw extruder. Of course, other combinations of equipment can also be employed (e.g., a plurality of thin-film evaporators in parallel or series, followed by extruders), and the process of the invention is not limited to any particular apparatus. The second phase only need be conducted until substantially complete polymerization and solvent removal, has been achieved. Generally, the processing times are relatively short (depending on the equipment used), e.g., less than about 15 minutes for the first phase and less than about 5–6 minutes for the second phase.

The present process overcomes a disadvantage of the Parekh process, namely the formation of PAMI and its plateout during film and sheet production, while retaining its many advantages. The lengthy reaction times and incomplete reactions associated with other solution polymerizations are avoided by the solvent removal and high-temperature processing. On the other hand, by conducting a prepolymerization reaction in solution, the problems commonly associated with melt polymerization techniques are avoided. The losses of volatile reactants are minimized, and the so-called "cement stage" does not occur.

Practice of the present invention is further illustrated by the following examples which should not be viewed as limiting the scope of the invention.

COMPARATIVE EXAMPLE

The formation of the undesirable byproduct PAMI during the preparation of polyetherimide via the Parekh process of U.S. Pat. No. 4,417,044 was illustrated as follows. A mixture of bisphenol A dianhydride (BPA-DA), phthalic anhydride (PA) and m-phenylene diamine (mPD) in o-dichlorobenzene was prepared by first dissolving 5.0225 g (9.650 millimoles) of BPA-DA and 0.1037 g (0.70 millimoles) PA in o-dichlorobenzene at approx. 90° C. and thereafter adding 1.0814 g (10.00 millimoles) mPD. The solution was slowly warmed to about 180° C. and refluxed under $N_2$ for 4 hours at this temperature to produce a prepolymer containing polyetherimide groups as well as acid amide groups. A 0.10 g sample was then removed to a small test tube and heated at approx. 350° C. for 15 minutes under $N_2$ to substantially finish the conversion to polyetherimide. The resulting polymer was dissolved in dichloromethane and its molecular weight was determined, by gel permeation chromatography (GPC) against a polystyrene standard, to be 24,000 $M_N$ (typical of the desired polyetherimides). The reaction solution was then analyzed for PAMI level via GPC using Polymer Science PL GEL columns (one micron mixed bed, one 5 micron 500 Å bed and one 5 micron 50 Å bed, the latter to separate PAMI from other low molecular weight monomers). PAMI level was determined against a known sample. The PAMI level was determined to be 730 ppm ±10 %.

EXAMPLE 1

A procedure similar to that described in the above Comparative Example was followed except that, according to the inventive process, a mixture of BPA-DA and mPD in o-dichlorobenzene was prereacted (refluxed) for 1 hour at approximately 150° C. prior to the addition of PA end capping agent. The mixture was refluxed for 3 additional hours following PA addition, heated to approx. 350° C. to finish the conversion to polyetherimide and then analyzed, all as above. GPC revealed a molecular weight of 24,700 $M_N$, demonstrating that the process according to the present invention produced polyetherimide of equivalent molecular weight as compared to the Comparative Example process. Further GPC analysis confirmed that PAMI content had been reduced to 90 ppm. Thus, the addition of PA following the prereaction of the BPA-DA and mPD is seen to greatly reduce the formation of PAMI.

EXAMPLES 2-11

Another series of reactions of BPA-DA, mPD and PA in o-dichlorobenzene, following the experimental procedures detailed in the Comparative Example and followed in Example 1 above, was conducted. In each of the following Examples the amounts of BPA-DA and mPD remained constant as set forth in the Comparative Example. The timing and amount of the PA addition was varied, however, to determine their affect on final PAMI content. For example, in some of the following reactions a portion of the PA was added along with the initial mixture of BPA-DA and mPD and the remainder of the PA was added after the reaction had progressed for the indicated period of time.

EXAMPLE 2

BPA-DA, mPD and 0.7 mmoles PA were reacted as set forth in the Comparative Example as a control. The PAMI concentration in the final polyetherimide product was 730 ppm.

EXAMPLE 3

The solution of BPA-DA and mPD was refluxed at approx. 190° C. (i.e. prereacted) for one hour. 0.7 mmoles of PA was added to the prereaction product and the solution was refluxed for 3 additional hours. The PAMI concentration in the final product was 100 ppm.

EXAMPLE 4

The procedure of Example 3 was repeated and resulted in 90 ppm of PAMI in the final product.

EXAMPLE 5

A solution of BPA-DA, mPD and 0.3 mmoles of PA was refluxed for one hour, at which point an additional 0.4 mmoles of PA was added. The mixture was refluxed an additional 3 hours. PAMI concentration was 90 ppm following the first hour of reflux but rose to 430 ppm following the addition of the remainder portion of PA, further reflux and heating to convert the prepolymer to polyetherimide. Thus it is seen that pre-reaction in the presence of even a small portion of the PA end capping agent results in comparatively high PAMI formation.

EXAMPLE 6

-An initial solution of BPA-D,, mPD and 0.3 mmoles PA was prepared. After 20 minutes of warming the temperature of the solution had reached 140° C. and at that time the PAMI content was 100 ppm. The remaining 0.4 mmoles of PA was added. The solution was brought to reflux temperature and held udder reflux for 4 hours. The PAMI content in the final product was 500 ppm.

EXAMPLE 7

An initial solution of BPA-DA, mPD and 0.3 mmole PA was refluxed for 1 hour. The mixture was then cooled to approx. 170° C. and extracted with 100 ml of water to remove any unreacted mPD. 0.4 mmoles PA was added to the reaction solution which was then refluxed an additional 3 hours. The final PAMI content was 410 ppm.

EXAMPLE 8

An initial solution of BPA-DA, mPD and 0.15 mmoles of PA was refluxed for 1 hour. The remaining 0.55 mmoles of PA was added, followed by 3 hours of further reflux. The final product contained 310 ppm of PAMI.

EXAMPLE 9

A solution of BPA-DA and mPD was refluxed for one hour. Then 0.7 mmoles PA and an additional 0.35 mmoles mPD was added and the resulting solution was refluxed an additional 3 hours. The final concentration of PAMI rose to 4200 ppm. due to the additional mPD.

EXAMPLE 10

A solution of BPA-DA, mPD and 0.3 mmoles of PA was refluxed for 1 hour. At that point the PAMI concentration was 100 ppm. 20 ml of water was added to the solution and was subsequently extracted. The remaining 0.4 mmoles of PA was added and the solution was refluxed for an additional 3 hours. The final PAMI concentration was 400 ppm.

EXAMPLE 11

In this Example the usefulness of phthalic acid as a PAMI-reducing end capping agent was evaluated. 5.0225 g (9.65 mmoles) of BPA-DA was dissolved in 14 ml o-dichlorobenzene in a 50 ml boiling flask. 0.1162 g (0.7 mmoles) phthalic acid was added but did not appear to go into solution. After 5 minutes 1.0814 g (10 mmoles) of mPD was added and the mixture was heated to approx. 180° C. for 4 hours. Subsequent heating at 350° C. as in the previous examples afforded a final product containing 500 ppm PAMI.

I claim:
1. A process for the preparation of a polyetherimide which comprises:
(a) prereacting an aromatic bis(ether anhydride) of formula

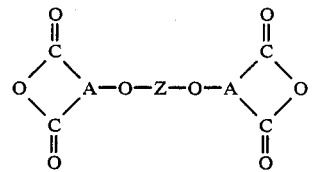

with an organic diamine of formula

under polyetherimide-producing conditions;
(b) reacting the reaction produce of step (a) with an end capping anhydride of formula

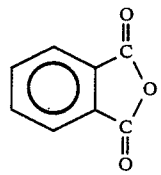

under conditions to form an end-capped prepolymer; and (c) heating said end-capped prepolymer under conditions to covert substantially all of said prepolymer to polyetherimide; wherein the group

is selected from:

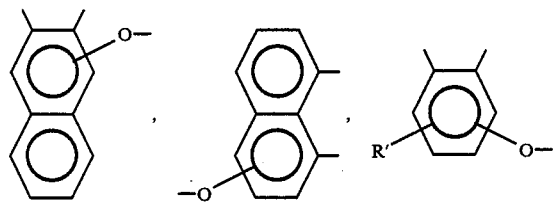

R' being hydrogen, lower alkyl or lower alkoxy, Z is a member of the class consisting of (1):

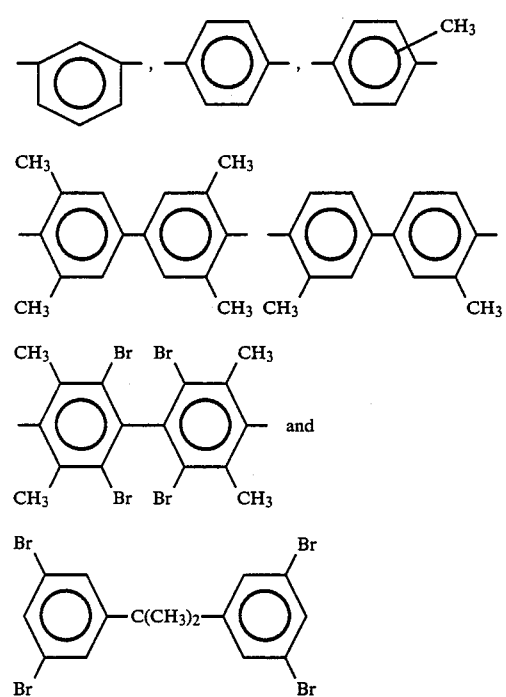

and (2) divalent organic radicals of the general formula

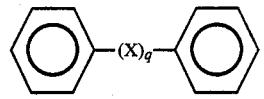

where X is a member selected from the group consisting of divalent radicals of the formulas

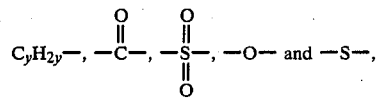

where q is 0 or 1, y is a integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, $C_2$ to $C_8$ alkylene-terminated polydiorganosiloxanes and (c) divalent radicals of the general formula

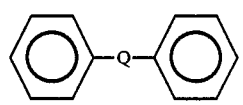

where Q is a member selected from the group consisting of

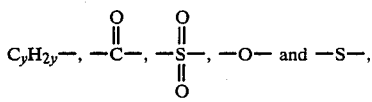

and y is a whole number from 1 to about 5, inclusive.

2. A process of claim 1 wherein R' is hydrogen such that the bis(etheranhydride) is of the formula:

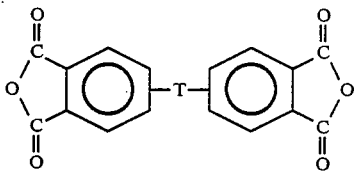

wherein T is —O— or a group of the formula

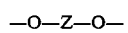

wherein the divalent bonds of the —O— or the —O—Z—O— group are in the 3,3'; 3,4'; 4,3', or the 4,4' position.

3. The process of claim 2, wherein the aromatic bis(ether anhydride) is of the formula

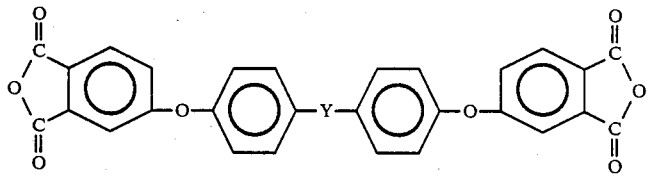

and Y is defined above.

4. The process of claim 1, wherein the aromatic bis(ether anhydride) is 2,2-bis[4-(3,4-dicarboxyphenoxy)phenyl]propane dianhydride and the organic diamine is m-phenylenediamine.

5. A process of claim 1 wherein step (a) is conducted in the presence of an inert solvent.

6. A process of claim 5 wherein the solvent is dichlorobenzene.

7. A process of claim 5 wherein the solvent is o-dichlorobenzene.

8. A process of claim 5 wherein said heating step (c) is conducted in two phases, a first phase comprising heating said end-capped prepolymer to substantially reduce solvent content and a second phase comprising heating and driving off substantially all of any remaining solvent and concurrently converting substantially all of any remaining prepolymer to polyetherimide.

9. A process of claim 8 wherein said first phase is conducted at a temperature between about 150° and about 190° C.

10. A process of claim 8 wherein said second phase is conducted at a temperature between about 250° and about 350° C.

* * * * *